May 24, 1949.  H. S. PASTURCZAK  2,471,237
SEPARABLE FLUID COUPLING
Filed July 8, 1948
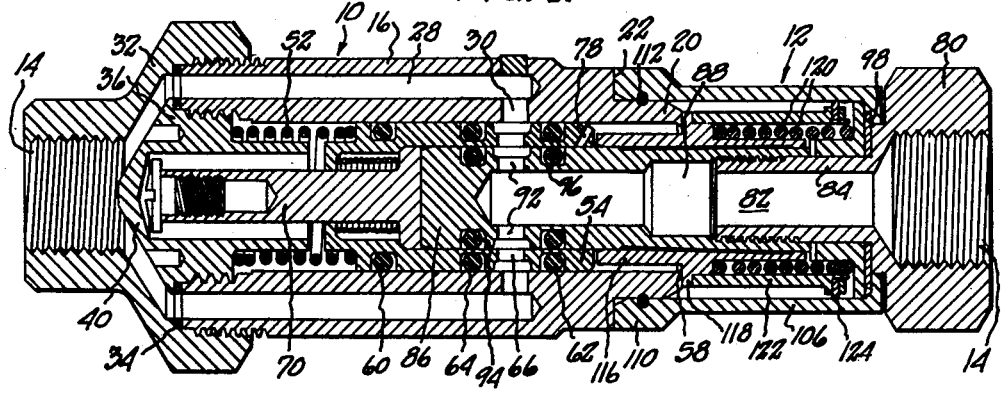
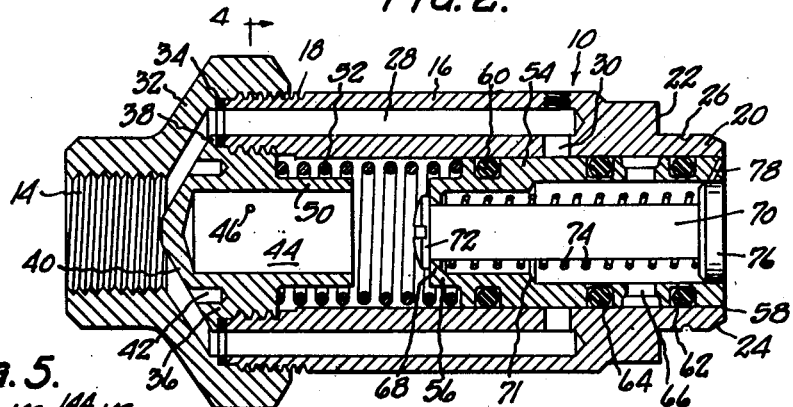
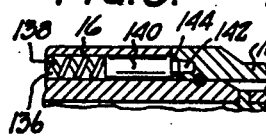
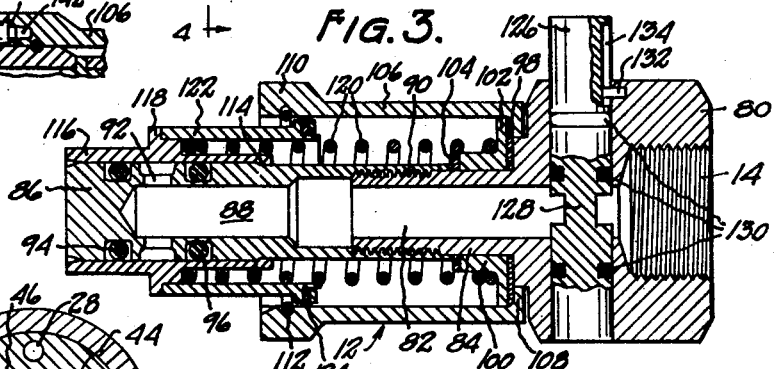
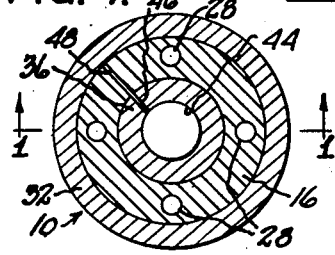
INVENTOR.
HARRY S. PASTURCZAK.
BY Oltsch & Knoblock
ATTORNEYS.

Patented May 24, 1949

2,471,237

UNITED STATES PATENT OFFICE 2,471,237

SEPARABLE FLUID COUPLING

Harry S. Pasturczak, East Moline, Ill., assignor of one-half to William J. Bleasdale, South Bend, Ind.

Application July 8, 1948, Serial No. 37,631

18 Claims. (Cl. 284—19)

This invention relates to improvements in separable fluid couplings.

The primary object of this invention is to provide a novel, simple and effective separable fluid coupling in which the coupling parts include valve members operable to shut off the flow of fluid in the line connected therewith when the coupler parts are separated, which device is characterized by complete avoidance of any projection of parts associated with the valve in the separated position of the valve, so that the valve elements of the couplers are protected against accidental opening when separated.

A further object is to provide a coupler of this character in which the two parts are easily and quickly connected when the fluid lines with which they are connected contain fluid under pressure and wherein the device is operative for use with fluid systems under pressure within a wide range, for example, a range from zero pressure to very high pressures, for example, in the order of 10,000 pounds per square inch.

A further object is to provide a separable coupler of this character, wherein each of the coupler parts have valve elements and said valve elements are in balance both when the coupler parts are connected and when they are disconnected, whereby the balance of the connected coupler parts avoids any tendency of the coupler parts to separate and thereby permits the interconnection of the coupler parts by a snug sliding or telescopic fit which eliminates the necessity for locking means between the coupler parts or permits the use of locking means of a character which can be operated by hand and without requiring the use of special tools.

A further object is to provide a coupler of this character wherein the coupling parts may rotate relative to each other or may oscillate out of exact axial alignment while the same are connected without tendency of the same to separate or without tendency of the coupler to leak.

A further object of the invention is to provide a device of this character wherein novel seals are provided in combination with the remaining parts of the device to assure against the leakage of the coupling when the coupling is assembled.

Other objects will be apparent from the following specification.

In the drawing:

Fig. 1 is a longitudinal sectional view taken on line 1—1 of Fig. 4, and illustrating the coupling in its operative assembly.

Fig. 2 is a longitudinal sectional view of one part only of the coupling.

Fig. 3 is a longitudinal sectional view of the other part of the coupling with certain modifications incorporated therein.

Fig. 4 is a reduced transverse sectional view taken on line 4—4 of Fig. 2.

Fig. 5 is a fragmentary detail sectional view illustrating a modification of the invention.

Referring to the drawing which illustrates the preferred embodiment of the invention, the numeral 10 designates one coupling part, and the numeral 12 a second coupling part. Each of these coupling parts is provided at its end with a fitting portion having an internally screw-threaded bore or socket 14 which is intended for connection with an externally screw-threaded fitting upon a line connected with a fluid system under pressure. The lines connected to the two coupling parts may be flexible conduits or any other units of a fluid system. Thus the coupler may be used to connect a flexible conduit to a stationary part or to connect the bores of any two parts of which at least one part is capable of bodily movement relative to the other in a direction to permit the coupler parts to interfit and to disengage.

The coupler part 10, best illustrated in Fig. 2, has a tubular body portion 16 which is externally screw-threaded at 18 at one end. The opposite end portion of the tubular body is reduced in its outer diameter to provide a neck 20, there being a transverse shoulder 22 between the main body portion and the neck 20. The end of the neck 20 is preferably tapered at 24, and the neck is preferably provided with a circumferential groove 26 intermediate the tapered portion 24 and the shoulder 22. The body 16 has a plurality of longitudinal bores 28 formed therein open at the threaded end thereof and extending for the major portion of the length of the large diameter part of the body but terminating spaced from the shoulder 22. Each of these bores 28 has a transverse passage 30 communicating therewith at its inner end and projecting inwardly and is open at the inner periphery of the body 16. A cap 32 is screw-threaded upon the threads 18 and has a screw-threaded central bore 14 therein. Any suitable gasket 34 may be interposed between an internal shoulder on the cap and the threaded end of the body 16.

A cup-shaped member 36 is screw-threaded in the body 16 and has an enlarged flange 38 bearing against the gasket 34. The closed end wall 40 of the member 36 confronts the bore 14 and is spaced from the inner wall of the cap 32 so that a clearance space is provided between the member 36 and the cap 32 for passage of fluid from the bore 14 to the bores 28. If desired, tool-receiving sockets 42 may be formed in the bore 36 to facilitate the assembly of the parts. The cup-shaped member has an axial socket or bore 44 formed therein open at its rear or inner end and closed at its outer end. A vent opening 46 extends radially through the part 36, as best illustrated in Fig. 4, and is adapted to communicate with a vent opening 48 extending radially within the body 16 between and spaced from the bores 28 for purposes to be mentioned hereinafter. The inner end portion 50 of the member 36 has a reduced external diameter neck portion and a coil spring 52 encircles the neck portion to bear against a shoulder between said neck portion and the enlarged threaded portion of the member 36.

A tubular spool valve member 54 has a snug freely sliding fit within the bore of the member 16 and its inner end portion 56 is of reduced dimension to provide a neck around which one end of the coil spring 52 may fit and a shoulder against which one end of the spring 52 may abut so as to urge the member 54 to the position illustrated in Fig. 2. The neck 20 includes a reduced inwardly projecting flange or lip 58 which limits the movement of the member 54 to the right and insures that said member will terminate flush with or inset from the end of the neck in the arrangement of the parts shown in Fig. 2. The member 54 has a circumferential groove adjacent its leading end which receives an annular resilient sealing member 60, such as an O-ring. Adjacent the opposite end portion of the member 54 is formed a similar circumferential groove which receives and mounts a similar annular resilient sealing element 62 and a third groove is formed in the member 54 intermediate the two first mentioned grooves and receiving a third annular resilient sealing element 64. The annular sealing element 64 is so positioned along the length of the member 54 that when the parts are assembled as illustrated in Fig. 2, the sealing element 64 will be positioned between the ports 30 of the body 16 and the right-hand end of the coupler body, as shown in Fig. 2. When the coupling parts are coupled as illustrated in Fig. 1, said seal will be spaced inwardly from the ports 30. A plurality of radial openings or passages 66 are formed in the member 54 between the sealing members 62 and 64 and so positioned that when the coupler is assembled as illustrated in Fig. 1, said openings 66 will communicate with the transverse bore portions 30 in the member 16. An inwardly projecting flange 68 is formed at the end of the neck portion 56, and a stud 70 has a guided sliding fit within said flange 68. The inner end of the stud mounts an enlarged head 72 which bears against the inner end of the flange 68 to limit movement of the stud to the right, as illustrated in Fig. 2. The diameter of this head 72 is less than the diameter of the bore 44 so that said head may move freely within the bore 44. A coil spring 74 encircles the stud 70 with one end thereof bearing against the inner face of the flange 68. The opposite end of the spring bears against an enlargement 76 fixed upon the stud 70 and slidable freely within the bore of the member 54. The spring 74 is much weaker than the spring 52 so that any pressure applied against the head 76 will cause a movement of the stud 70 without transmitting that movement to the member 54. The outer end of the member 54 has one or more diagonal passages 78 formed therein for pressure relieving purposes to be mentioned hereinafter.

The part 12 of the coupler comprises a member having a large dimension end part 80 in which the screw-threaded bore 14 is formed for communication with an elongated passage 82 formed axially in the member 80 and extending through a reduced diameter tubular portion 84 projecting from the part 80. A plunger having a head 86 at one end and a bore 88 extending axially thereof for the major portion of its length and terminating inwardly of the head 86, is fixedly mounted upon the part 84 as by means of screw threads 90 at its inner end engaging similar threads on the end portion 84. Thus it will be seen that the plunger is fixed to the parts 80, 84, and its bore 88 communicates with the bores 82 and 14. Adjacent the inner end of the bore 88 a plurality of radial openings 92 are formed in the plunger. The plunger has a circumferential groove formed therein between its outer end and the bores 92, which groove receives an annular resilient sealing member 94. A second circumferential groove is formed in the plunger on the opposite side of the openings 92 and receives a second annular resilient sealing member 96. A swivel thrust washer 98 bears against the shoulder between the parts 80 and 84, and an annular member 100 encircles the member 84 and has an enlarged flange 102 bearing against the swivel thrust washer 98. An annular gasket 104 is interposed between the adjacent ends of the plunger and the member 100. A cylindrical coupling body 106 has an inwardly projecting annular flange 108 at one end thereof whose inner surface is adapted to bear against the swivel washer 98 to retain the cylindrical member 106 to the member 80 in substantially axial alignment therewith but in a manner to permit free rotation of the part 106 with respect to the part 80. The member 106 preferably has an enlarged outwardly projecting flange portion 110 at its left-hand end as viewed in Fig. 3 and adjacent this end portion is internally circumferentially grooved to receive a snap ring 112 adapted for a releasable snap locking fit within the groove 26 of the coupling part 10 when the coupling is assembled as illustrated in Fig. 1.

The inner end portion of the plunger is slightly smaller in diameter than the portion thereof in which the grooves receiving the annular sealing members 94 and 96 are formed, thereby providing a shoulder 114. A sleeve 116 encircles and has a snug slidable fit upon the large diameter outer end portion of the plunger and a reduced inner end providing a shoulder engageable with the shoulder 114 for limiting outward movement of the sleeve 116 relative to the plunger head 86 so that said sleeve terminates flush with or slightly inset from the end surface of the head 86 in the uncoupled position of the parts illustrated in Fig. 3. This sleeve has a circumferential enlarged flange 118 intermediate its ends, said flange preferably being of stepped form. A coil spring 120 encircles the plunger and the inner end of the sleeve 116 so that its outer end may bear against the flange 118. The opposite end of the spring 120 bears against the flange 102 of the sleeve 100. Thus the spring 120 normally urges the parts to the Fig. 3 position in which the sleeve closes the radial openings or ports 92 in the plunger and bears against the two sealing rings 94 and 96 on opposite sides of said ports 92. A wiper sleeve 122 is mounted fixedly upon the flange 118 of the sleeve 116 at a step thereof and projects into the cylindrical member 106. The sleeve 122 encircles a portion of the spring 120 and at its inner end is circumferentially grooved or otherwise constructed to receive and retain an annular wiping ring 124 which has a snug wiping fit with the bore of the cylindrical member 106.

If desired, a secondary valve may be provided in the member 12 as illustrated in Fig. 3. This construction entails the formation in the head 80 of a transverse bore intersecting the bore 82 and slidably receiving a shaft or stud 126 with a snug fit. The shaft 126 has a reduced neck portion 128 formed intermediate its ends and adapted in one position thereof to register with the bore 82 so as to open said bore into communication with the bore portion 14. Circumferential grooves may be formed in the member 126 at opposite sides of the neck 128 to receive annular resilient sealing members 130. Any suitable means may be provided to prevent withdrawal of the member 126 from the member 80. As here shown said means comprise a pin 132 carried by the member 80 and having a sliding fit in a longitudinal groove 134 formed in the member 126 so that sliding action of the member 126 is limited by the length of the groove 134. Alternatively, other means, such as the provision of enlarged heads at both ends of the member 126, may be provided to serve the same purpose.

In some instances it may be desired to restrain the cylindrical member 106 against rotation relative to the member 16 when the coupling parts are assembled, and for this purpose a construction may be provided as illustrated in Fig. 5, wherein the member 16 has a longitudinal bore 136 formed therein open at the shoulder 22 and spaced from and out of line with the passages 28. A coil spring 138 fits within said bore and presses outwardly against a pin 140 having a reduced head portion 142 and a shoulder at the base or inner end of the reduced portion 142 which is adapted to bear against a stop, such as a crimp 144 formed in the member 16 at the mouth of the bore 136. A suitable socket or opening may be formed in the enlarged flange portion 110 of the sleeve 106 to receive the head 142 of the pin.

Assuming that the two parts of the coupling are connected with different parts of a fluid pressure system by connections effected at the threaded sockets 14 at the opposite ends thereof so that one or both parts of the system with which the respective coupler parts 10 and 12 are connected contain fluid under presure, and assuming further that the parts of the coupling are disconnected, it will be apparent that the couplers constitute valves which prevent leakage in the system. Thus any fluid pressure in the part 10 entering through the inlet 14 and extending through the bores 28 to the ports 30 is prevented from escape by the sealing rings 60 and 64 encircling the spool valve 54, it being understood that the sealing members 60 and 64 are of a character to provide a seal around this spool valve. At the same time with respect to coupler part 12, the valve sleeve 116 is urged by the spring 120 to the extended position shown in Fig. 3 in which it substantially completely encircles the plunger 86 and bears against the sealing rings 94 and 96 on opposite sides of the radial ports 92 which constitute the sole outlet for any fluid pressure introduced into the device through the fitting of bore or inlet 14. In case of the use of a valve, such as the member 126, a secondary seal can be provided which will close off the bore 82 spaced from the ports 92, the said action being accomplished by shifting the member 126 to the position opposite that shown in Fig. 3 so as to span and close effectively said bore 82.

The parts of the coupler may be connected while subject to pressure in this manner by simply holding the coupling parts in axial alignment and then pressing them together in such a manner as to cause the plunger 86 of the part 12 to enter the spool 54 of the part 10. The initial inserting movement of the parts entails engagement of the plunger 86 with the enlarged head 76 on the stud 70 so as to displace said stud in the spool valve 54 against the action of the spring 74. Simultaneously with this action the sleeve 116 of the part 12 which bears against the end of the spool 54 is displaced against the action of the spring 120 of the member 12. The difference in the strength of the springs 52, 74 and 120 permits this movement of the plunger 86 into the spool 54 until the ports 92 thereof are brought into register with the ports 66 of the spool 54. At this time the sleeve valve 116 will have been shifted substantially to the full limit of its possible movement, and the head 76 on the shaft 70 will have been moved into engagement with a shoulder 71 in the bore of the spool valve 54. Consequently, continued axial movement of the coupling parts toward each other entails a direct transmission of force from the plunger 86, the head 76 and the shoulder 71 to the body of the spool valve 54, whereupon said spool valve will be moved bodily to such a position that the registering ports 92 and 66 will be brought into register in turn with the lateral ports 30 of the housing part 16 of the valve member 10. Thereupon full communication is established between the two lines or other parts of the fluid system to which the couplers are connected. Said communication, assuming that the pressures are such as to create a flow from the member 10 to the member 12, will be from the inlet 14 of the member 10 through the passages 28 and 30 of its casing, and thence through the ports 66 and 92 to the passage 82 of the unit 12. Note in this arrangement of the parts that leakage at the joint between the casing 16 and the spool valve 54 is prevented by the sealing members 62 and 64. Similarly, leakage between the plunger 86 and the spool valve 54 is prevented by the annular sealing members 94 and 96. All other points at which leakage might occur are also suitably sealed by the use of gaskets, such as the gaskets 34 and 104. The movement of the parts to this coupled relation entails the retraction of the shaft 70 so that its head 72 enters the socket 44 of the part 36 of the member 10. This action is accommodated without resistance from the building of fluid pressure incident to the reduction of the size of the chamber inwardly of the spool valve 54 by virtue of the provision of the vent ports 46 and 48. The snap ring 112 is so positioned that when the two coupling parts are fully assembled as shown in Fig. 1, said ring will snap in the circumferential groove 26 of the coupling member 10 and provide an interlock of sufficient pressure to hold the parts in their assembled or coupled relation.

This device has various advantages. Observe that each of the coupler parts has its valve elements either flush with or inset from the fixed part thereof, so as to be protected by the fixed part against displacement which would tend to open the valve and release the pressure therein. The easy sliding assembly and disassembly of the couplers is another outstanding advantage of the invention, it being apparent that by the use of snap rings or any other locking means of similar character, the parts can be held effectively but without pressure sufficient to resist their separation or application manually and without the use of tools.

Another advantage of outstanding importance in a device of this character is the fact that the valves of the two parts of the coupler are always in hydraulic balance, and the fluid pressure therein therefore prevents any tendency of the coupler parts to separate. Note that the fluid pressure in the system does not act upon the coupler parts in a manner to separate them. Thus the fluid pressure acts upon the sliding part or valve element of each coupler part or unit in a direction transverse of its direction of sliding movement. Thus, considering part 10, it will be apparent that any pressure entering the inlet 14 thereof and passing through the ports 28 is diverted to an inward radial movement so that no tendency occurs for the pressure to move the valve spool 54 in the direction of its length. The same condition applies with respect to the coupler part 12 inasmuch as fluid entering the inlet 14 and passing through the bore 82 can be discharged only in a radial outward direction through the ports 92. The balance of the parts, which is effected as aforesaid, is of great importance in facilitating the rapid connection and disconnection of the coupler parts and in reducing to a very simple form or character the locking means tending to hold those parts assembled or connected. Upon disconnection, the occurrence of any suction effect, and particularly the provision of any action which would tend to extrude the sealing member 96 after the same is withdrawn from the valve spool 54 and before the sleeve 116 can encircle and protect said element 96, is prevented by the bleed port 78. While such a bleed port is not essential or critical in a device of this character, its use to prevent damage to the unit due to extrusion of its seals is of substantial importance and value.

One feature of the invention which is of some importance is the fact that the absence of any coupler separating application of the pressure of the fluid permits the lock to be constructed to have a predetermined "dead weight break away tension," regardless of the pressure in the system. In other words, the force required to hold the coupler parts together, such as the force exerted by the snap ring 112, will remain constant whether the fluid system is under a very low pressure or a very high pressure. This, coupled with the ability to couple and uncouple manually while the system is under high pressure, renders the device useful in many fields of use not hitherto possible where the locking means was required to have a break-away tension proportional to and sufficient to resist the pressure in the line or system.

Observe also that the coupling parts may rotate relative to each other and oscillate out of axial alignment. Such rotation may occur either at the lock between the parts, that is at the snap ring, or at the head of the part mounting the plunger 86. The latter arrangement is preferred since the snap lock tends to separate when rotated and oscillated in this manner, especially when the coupler is used to connect two sections of a flexible freely suspended line or conduit. One instance of such use is the incorporation of a coupler in the hydraulic pressure line between a tractor and an implement where the tractor carries a hydraulic pump and the implement carries a device adapted to be actuated by the pressure generated by the pump. Another application in which this feature becomes important is where the device is used to couple fluid pressure lines between a tractive vehicle and a trailer or semi-trailer. If desired, of course, the snap locked parts may be held against rotation by a construction as illustrated in Fig. 5.

While the preferred construction of the device has been illustrated and described herein, it will be understood that changes in the construction may be made within the scope of the appended claims without departing from the spirit of the invention.

I claim:

1. A separable fluid coupling comprising a pair of parts interfitting telescopically, one of said parts comprising a housing having a socket formed therein and a fluid passage terminating in a transverse port open at said socket intermediate the ends thereof, a spool valve slidable in said housing socket and having a longitudinal socket and a transverse port adapted to register with said housing socket in one position, the other part comprising a body having an end portion adapted to fit in said spool valve socket, said body having a fluid passage terminating in a lateral port adapted to register with said spool valve port when said end portion fits operatively in said spool valve socket, and a sleeve slidable on said end portion between a port-sealing position and a coupling position clear of said port.

2. A separable fluid coupling as defined in claim 1, and a snap lock carried by one part and engageable with the other part to accommodate coupling and uncoupling of said parts manually.

3. A separable fluid coupling as defined in claim 1, wherein annular resilient sealing members seal the clearance between said spool valve and its housing on opposite sides of said housing part and annular resilient sealing members are carried by and encircle the end portion of said last named part on opposite sides of the lateral port thereof to selectively seal the clearance between said end portion and said sleeve or between said end portion and said spool valve socket.

4. A separable fluid coupling as defined in claim 1, wherein a spring normally urges said spool valve toward the open end of said first socket and against a stop positioned to confine said spool valve completely within the outline of its housing, and a spring normally urges said sleeve to port-sealing position and against a stop located to hold said sleeve entirely inwardly from the leading edge of the body portion encircled thereby.

5. A separable fluid coupling as defined in claim 1, wherein a spring urged insert is mounted slidably in said spool valve socket to normally close the mouth of said socket.

6. A separable fluid coupling as defined in claim 1, wherein a tubular housing encircles a portion of the body of said last named part spaced rearwardly from said ports and said sleeve includes a portion fitting telescopically within said tubular housing.

7. A separable fluid coupling comprising male and female parts adapted to interfit telescopically, said female part having a fluid passage terminating in a transverse port intermediate the ends of said part and open at the bore of said part, a slide valve in said female part having a longitudinal socket adapted to slidably receive said male part and a transverse port communicating with said socket and adapted to register with said first port in the coupled position of said parts, said male portion having a fluid passage terminating in a transverse port adapted to register with said first named ports when the parts interfit, sealing means between said slide valve and female part and sealing means between said male part and said slide valve.

8. The construction defined in claim 7, and means for sealing the port of said male part when the same is withdrawn from the female part.

9. The construction defined in claim 7, wherein a sleeve encircles said male part and is slidable thereon to close the port thereof when said coupling parts are disconnected, said last named sealing means being carried by said male part and adapted to engage said sleeve.

10. The construction defined in claim 7, wherein said sealing means each comprise a pair of spaced annular resilient members, said ports being located between said members.

11. The construction defined in claim 7, wherein a sleeve encircles said male part and a spring normally urges said sleeve to a position closing the port of said male part, and a spring of greater strength than said first spring normally urges said slide valve to a position with its port spaced longitudinally from the port of said female part.

12. The construction defined in claim 7, wherein a spring normally urges said slide valve to a position in said female part wherein the ports thereof are longitudinally off-set, a plunger is slidable in the socket of said slide valve, and a spring of lesser strength than said first spring normally urges said plunger to a position closing the mouth of said socket.

13. The construction defined in claim 7, wherein said slide valve has a bleed port adjacent the mouth of its socket and open at its outer end and at said socket, respectively.

14. The construction defined in claim 7, wherein a plunger has a guided slide fit in the socket of said slide valve and is adapted to project inwardly from said slide valve when said parts are coupled, said female part having a bleed port therein spaced inwardly from the inner end of said male part when said parts interfit.

15. The construction defined in claim 7, wherein said female part includes a tubular member, a cap mounted on one end of said member and having a central bore, said fluid passage extending longitudinally through its wall and open at the end of said member mounting said cap, said cap having a clearance with the end of said tubular member.

16. The construction defined in claim 7, wherein one of said parts mounts a manually operable snap lock engaging the other part to restrain said part against longitudinal separation, and a member carried by one part and engaging the other to prevent relative rotation of said parts.

17. The construction defined in claim 7, wherein one of said parts mounts a manually operable valve element selectively positioned intermediate the ends of its fluid passage.

18. The construction defined in claim 7, wherein said male part has a transverse passage therein at a part clear of said female part when said parts interfit and intersecting the fluid passage, and a cylindrical member having a sealed sliding fit in and being of greater length than said transverse passage, said member normally closing said fluid passage and including a portion adapted to register with said fluid passage in one operative position accommodating fluid flow transversely thereof and through said passage.

HARRY S. PASTURCZAK.

No references cited.